(12) United States Patent
Gruenbichler et al.

(10) Patent No.: US 11,557,410 B2
(45) Date of Patent: Jan. 17, 2023

(54) CERAMIC MATERIAL, VARISTOR, AND METHOD FOR PRODUCING THE CERAMIC MATERIAL AND THE VARISTOR

(71) Applicant: TDK Electronics AG, Munich (DE)

(72) Inventors: Hermann Gruenbichler, St. Josef (AT); Andreas Buergermeister, Graz (AT); Michael Hofstaetter, Graz (AT); Thomas Feichtinger, Graz (AT)

(73) Assignee: TDK ELECTRONICS AG, Munich (DE)

( * ) Notice: Subject to any disclaimer, the term of this patent is extended or adjusted under 35 U.S.C. 154(b) by 107 days.

(21) Appl. No.: 17/045,909

(22) PCT Filed: Jun. 4, 2019

(86) PCT No.: PCT/EP2019/064528
§ 371 (c)(1),
(2) Date: Oct. 7, 2020

(87) PCT Pub. No.: WO2020/007553
PCT Pub. Date: Jan. 9, 2020

(65) Prior Publication Data
US 2021/0035714 A1    Feb. 4, 2021

(30) Foreign Application Priority Data

Jul. 4, 2018    (DE) .......................... 102018116222.7

(51) Int. Cl.
*H01C 7/112*    (2006.01)
*C04B 35/453*    (2006.01)
(Continued)

(52) U.S. Cl.
CPC ............ *H01C 7/112* (2013.01); *C04B 35/453* (2013.01); *C04B 35/62625* (2013.01);
(Continued)

(58) Field of Classification Search
CPC .............................. C04B 35/453; H01C 7/112
See application file for complete search history.

(56) References Cited

U.S. PATENT DOCUMENTS

| 2,285,624 A | 6/1942 | Tanner |
| 4,767,729 A | 8/1988 | Osman et al. |

(Continued)

FOREIGN PATENT DOCUMENTS

| CN | 86102994 A | 10/1986 |
| CN | 101116154 A | 1/2008 |

(Continued)

*Primary Examiner* — Karl E Group
(74) *Attorney, Agent, or Firm* — Slater Matsil, LLP

(57) ABSTRACT

In an embodiment a ceramic material includes ZnO as main constituent, Y as a first additive, second additives including at least one compound containing a metal element, wherein the metal element is selected from the group consisting of Bi, Cr, Co, Mn, Ni and Sb, $Si^{4+}$ as a first dopant and second dopants having at least one compound containing a metal cation from $Al^{3+}$, $B^{3+}$, or $Ba^{2+}$, wherein a corresponds to a molar proportion of Bi calculated as $Bi_2O_3$, b corresponds to a molar proportion of Y calculated as $Y_2O_3$, c corresponds to a molar proportion of Al calculated as $Al_2O_3$, d corresponds to a molar proportion of Ba calculated as BaO, e corresponds to a molar proportion of B calculated as $B_2O_3$, f corresponds to a molar proportion of Si calculated as $SiO_2$, g corresponds to a molar proportion of Ni calculated as NiO, h corresponds to a molar proportion of Co calculated as $Co_3O_4$, i corresponds to a molar proportion of Cr calculated as $Cr_2O_3$, j corresponds to a molar proportion of Sb calculated as $Sb_2O_3$, and k corresponds to a molar proportion of Mn calculated as $Mn_3O_4$.

20 Claims, 2 Drawing Sheets

(51) Int. Cl.
  *H01C 17/065* (2006.01)
  *C04B 35/626* (2006.01)
  *C04B 35/63* (2006.01)

(52) U.S. Cl.
  CPC .... *C04B 35/62655* (2013.01); *C04B 35/6303* (2013.01); *H01C 17/06546* (2013.01); *C04B 2235/3215* (2013.01); *C04B 2235/3217* (2013.01); *C04B 2235/3225* (2013.01); *C04B 2235/3241* (2013.01); *C04B 2235/3263* (2013.01); *C04B 2235/3277* (2013.01); *C04B 2235/3279* (2013.01); *C04B 2235/3284* (2013.01); *C04B 2235/3294* (2013.01); *C04B 2235/3298* (2013.01); *C04B 2235/3409* (2013.01); *C04B 2235/3418* (2013.01); *C04B 2235/606* (2013.01); *C04B 2235/656* (2013.01)

(56) References Cited

U.S. PATENT DOCUMENTS

| | | | |
|---|---|---|---|
| 5,039,452 A | 8/1991 | Thompson et al. | |
| 5,807,510 A | 9/1998 | Furuse et al. | |
| 6,184,770 B1 | 2/2001 | Nakamura et al. | |
| 7,948,354 B2 | 5/2011 | Miura et al. | |
| 2002/0121960 A1* | 9/2002 | Ando | H01C 7/13 338/21 |
| 2016/0379738 A1 | 12/2016 | Okamoto et al. | |
| 2019/0103206 A1 | 4/2019 | Wang et al. | |

FOREIGN PATENT DOCUMENTS

| | | |
|---|---|---|
| CN | 101333104 A | 12/2008 |
| DE | 4435795 A1 | 4/1996 |
| DE | 19915661 A1 | 10/1999 |
| DE | 102007062357 A1 | 7/2009 |
| DE | 102016104990 A1 | 9/2017 |
| EP | 0200126 A1 | 11/1986 |
| EP | 2857374 A1 | 4/2015 |
| JP | 2001089228 A | 4/2001 |
| JP | 2001233668 A | 8/2001 |
| JP | 2002343611 A | 11/2002 |
| JP | 2007329175 A | 12/2007 |
| JP | 2015053313 A | 3/2015 |
| WO | 2014101035 A | 7/2014 |

* cited by examiner

CERAMIC MATERIAL, VARISTOR, AND METHOD FOR PRODUCING THE CERAMIC MATERIAL AND THE VARISTOR

This patent application is a national phase filing under section 371 of PCT/EP2019/064528, filed Jun. 4, 2019, which claims the priority of German patent application 102018116222.7, filed Jul. 4, 2018, each of which is incorporated herein by reference in its entirety.

TECHNICAL FIELD

The invention relates to a ceramic material and to a varistor comprising a ceramic body made of the sintered ceramic material. It further relates to a process for producing the ceramic material and to a process for producing the varistor.

BACKGROUND

Monolithic and multilayer varistors based on ZnO ceramics are widely used components for protection from overvoltages. Owing to ever increasing demands in the area of performance and miniaturization of such components, it is necessary to ever further increase the specific varistor voltage (≥100 V/mm). Particularly in the field of multilayer varistors, it would thus be possible to achieve more active layers for the same active volume, which in turn increase the active area, by means of which higher currents can be dissipated. It would also be possible to achieve higher input voltages of the multilayer varistor for the same layer thickness, for example, in the region of 230 V mains voltage. Furthermore, an increase in the specific varistor voltage means that lower layer thicknesses are necessary to obtain a given input voltage.

Since the specific varistor voltage increases with the number of series-connected grain boundaries of ZnO grains between the contacts of the varistor, one option to increase the specific varistor voltage in a given volume is to reduce the size of the ZnO grains and hence to increase the number of series-connected grain boundaries in a given volume.

German Patent Application No. DE 199 15 661 A1 discloses a multilayer varistor in which the average grain size of the ZnO grains in the ceramic body of the varistor is within a range between 0.9 m and 3.0 μm inclusive and which has a specific varistor voltage of ≥1000 V/mm. Owing to the relatively large amount of additives used that permit the sintering of the ceramic body at relatively low temperatures (850-900° C.), it is difficult to limit the grain growth of the ZnO grains during the sintering, and there is an increased probability of occurrence of inactive secondary phases, especially $B_2O_3$.

German Patent Application No. DE 10 2016 104 990 A1 discloses a process for producing a monolithic varistor comprising a ceramic body, in which a smaller amount of additives (≤5% based on 100 mol % of ZnO) is used for production of the ceramic body. This limits grain growth and reduces the occurrence of inactive secondary phases. The varistor thus obtained has a specific varistor voltage of only 640 V/mm at most.

SUMMARY

Embodiments provide a ceramic material that improves the limitation of grain growth during sintering and in which the occurrence of inactive secondary phases is reduced. Further embodiments provide a varistor having a specific varistor voltage of 1000 V/mm. Yet further embodiments provide a process for producing the ceramic material and a process for producing a varistor.

Embodiments provide a ceramic material containing ZnO as main constituent and additionally at least one additive and at least one dopant. The additive comprises a compound containing a metal element selected from a group comprising Bi, Sb, Y, Co, Cr, Mn and Ni. The dopant comprises a compound containing a metal cation selected from a group comprising $Al^{3+}$, $B^{3+}$, $Si^{4+}$ and $Ba^{2+}$. In respect of the molar proportions specified hereinafter of the added metal elements and metal cations, a corresponds to the molar proportion of Bi calculated as $Bi_2O_3$, b corresponds to the molar proportion of Y calculated as $Y_2O_3$, c corresponds to the molar proportion of Al calculated as $Al_2O_3$, d corresponds to the molar proportion of Ba calculated as BaO, e corresponds to the molar proportion of B calculated as $B_2O_3$, f corresponds to the molar proportion of Si calculated as $SiO_2$, g corresponds to the molar proportion of Ni calculated as NiO, h corresponds to the molar proportion of Co calculated as $Co_3O_4$, i corresponds to the molar proportion of Cr calculated as $Cr_2O_3$, j corresponds to the molar proportion of Sb calculated as $Sb_2O_3$, k corresponds to the molar proportion of Mn calculated as $Mn_3O_4$ and the molar proportions mentioned are based on 100 mol % ZnO, where $0.1$ mol % $\leq a \leq 0.99$ mol %, $0.5$ mol % $\leq b \leq 3.0$ mol %, $0$ mol % $\leq c < 0.1$ mol %, $0$ mol % $\leq d < 0.1$ mol %, $0$ mol % $\leq e < 0.1$ mol %, $0$ mol % $\leq f < 0.1$ mol %, $0.7$ mol % $\leq g \leq 1.5$ mol %, $0.3$ mol % $\leq h \leq 0.8$ mol %, $0.0$ mol % $\leq i \leq 0.3$ mol %, $1.1$ mol % $\leq j \leq 1.9$ mol %, $0.2$ mol % $\leq k < 0.4$ mol %.

The additives that are added to the main ZnO constituent may comprise at least one metal-containing compound selected from a group comprising metal oxides, metal carbonates, metal acetates, metal nitrates and mixtures thereof.

In addition, at least one of the additives may be selected from a group comprising $Bi_2O_3$, $Sb_2O_3$, $Co_3O_4$, $Mn_3O_4$, NiO, $Cr_2O_3$, $Y_2O_3$.

The dopants that are added to the main ZnO constituent may comprise at least one compound selected from a group comprising metal nitrides, metal nitrates, metal acetates, metal hydroxides, metal oxides and mixtures thereof. In addition, the dopants may be added as aqueous solutions.

The additives and dopants are required to limit grain growth during the sintering and to improve specific varistor properties, such as high-temperature power loss, leakage current and/or nonlinearity of the I/V curve of a varistor. In addition, the proposed additives and dopants can lower the sintering temperature of the ceramic material.

This results in a maximum sintering temperature of the ceramic material according to embodiments of only 1010° C. The lower energy expenditure enables rapid and inexpensive production of varistors. In addition, the resulting energy saving is also advantageous with regard to environmental protection. A lower sintering temperature also reduces the risk of volatile starting compounds evaporating or subliming during the sintering and the composition of the ceramic then becoming deficient in this material.

Embodiments further provide a process for producing the ceramic material, wherein a first portion of the additives is mixed with water and ground. Subsequently, the dopants are added in a water-soluble form in order to assure homogeneous distribution of the dopants. The main ZnO component is added to the first suspension thus produced, and grinding is continued until the desired average grain size has been attained.

In a second step, a colloidal suspension containing at least one further compound selected from the group of the additives is prepared, by first preparing a solution of the additive which is converted to the colloidal suspension by precipitation by means of a precipitant while stirring.

In a next step, the colloidal suspension is mixed with the first suspension containing the first portion of the additives, the dopants and the main ZnO component. Once a homogeneous resulting suspension has been produced from the mixture, it is dried, sieved and freed of volatile components in an oven in order to obtain the ceramic material.

According to at least one further embodiment, the solution for production of the colloidal suspension may contain an yttrium-containing compound selected from the group of the additives which is precipitated by means of a precipitant. By addition of this colloidal suspension to the first suspension containing the first portion of the additives, the dopants and the ZnO, the yttrium can be optimally distributed around the finely grinded ZnO grains and hence efficiently limit the growth of the ZnO grains during the sintering, which leads to a high number of ZnO grains for any given volume and hence to a high volume efficiency of the sintered ceramic material.

Since the optimum distribution of the yttrium already achieves very good limitation of grain growth during sintering, the amount of additives that are likewise supposed to result in limitation of grain growth during sintering can be reduced. Since these additives tend to form inactive secondary phases between the ZnO grains and hence have an adverse effect on the varistor properties, a reduction in the proportion of these additives leads to an improvement in the varistor characteristics such as specific varistor voltage.

Also provided is a process for producing a varistor. This produces a ceramic body containing the ceramic material that has been produced according to one of the preceding embodiments. This involves forming the ceramic body and sintering at a maximum of 1010° C. Electrode layers are applied to the sintered ceramic body in order to form contacts therewith.

Embodiments further provide a process for producing a monolithic varistor. The varistor contains a ceramic body consisting of the ceramic material that has been produced according to any of the preceding embodiments. For the formation of the ceramic body, a ceramic mass consisting of the ceramic material produced according to any of the preceding embodiments, water and organic binders is produced. The ceramic mass is dried and sieved in order to obtain granulate. The granulate is pressed, debindered and sintered in order to form the ceramic body. The surfaces of the ceramic body thus obtained are ground flat and provided with metal contacts. This can be affected by applying a metal-containing paste to the ground surfaces and then baking it into the ceramic body.

Embodiments further provide a process for producing a multilayer varistor containing a ceramic body consisting of the ceramic material that has been produced according to any of the preceding embodiments. For the formation of the ceramic body in a multilayer design, the ceramic material that has been produced according to any of the preceding embodiments is processed to give a green film, called ceramic film hereinafter. For this purpose, the ceramic material is suspended in a solvent and provided with auxiliaries for film drawing. Subsequently, the film is drawn by a suitable process and then printed with metallic inner electrodes. Thereafter, a desired number of such printed films is stacked and pressed in the stack. Components in the desired area and number are punched out of the pressed film stacks, then debindered and sintered at a maximum of 1010° C. For the contacting of the inner electrodes, a metal-containing paste may be applied to the sintered component and baked.

BRIEF DESCRIPTION OF THE DRAWINGS

There follows a detailed description of the invention with reference to working examples and accompanying figures.

DETAILED DESCRIPTION OF ILLUSTRATIVE EMBODIMENTS

Figure 1:
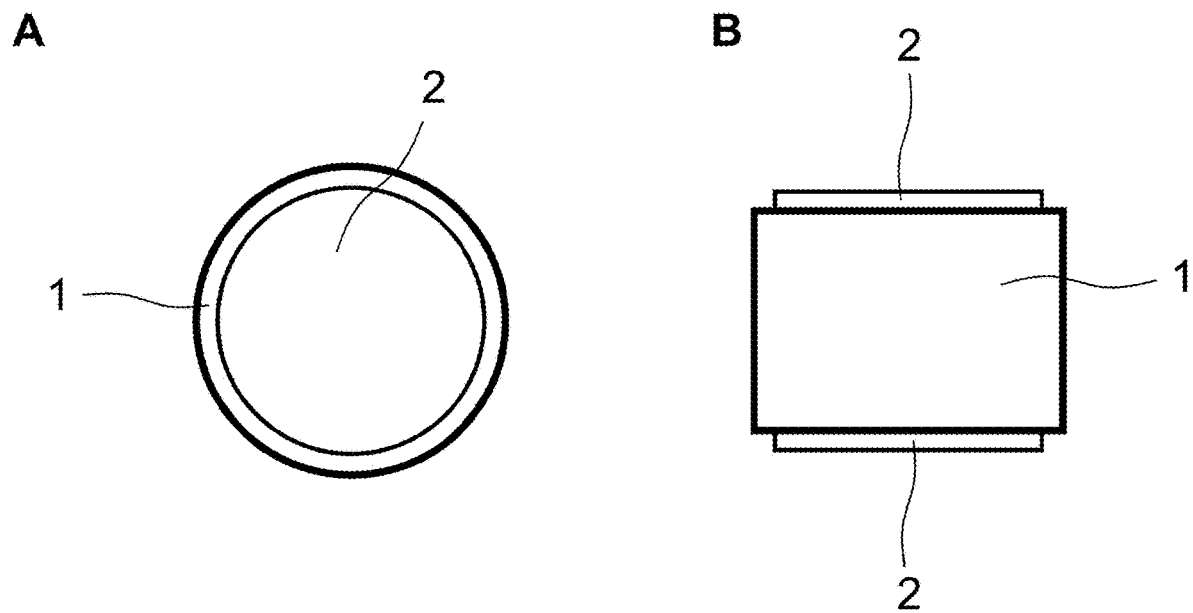
FIG. 1 shows a top view (A) and a side view (B) of a working example of a monolithic varistor containing a ceramic body in cylindrical form.

Identical elements, similar elements or those that appear to be the same are given the same reference numerals in the figures. The figures and the size ratios in the figures are not true to scale.

FIG. 1 shows a top view (A) and a side view (B) of one embodiment of a monolithic varistor containing a ceramic body 1 in cylindrical form that has been produced from ceramic material according to embodiments. For the production of the ceramic material, a suspension was first produced from a first portion of the additives and the dopants. For this purpose, oxides or other suitable oxide-convertible starting compounds of Bi (0.58 mol %, calculated as $B_2O_3$ and based on 100 mol % of ZnO), Cr (0.0 mol %≤Cr≤0.3 mol %, calculated as $Cr_2O_3$ and based on 100 mol % of ZnO), Co (0.3 mol %≤Co≤0.8 mol %, calculated as $Co_3O_4$ and based on 100 mol % of ZnO), Mn (0.2 mol %≤Mn≤0.4 mol %, calculated as $Mn_3O_4$ and based on 100 mol % of ZnO), Ni (0.7 mol %≤Ni≤1.5 mol %, calculated as NiO and based on 100 mol % of ZnO) and Sb (1.1 mol %≤Sb≤1.9 mol % calculated as $Sb_3O_2$ and based on 100 mol % of ZnO) were weighed out, mixed with water and ground by means of a horizontal stirred ball mill with $ZrO_2$ grinding bodies. Subsequently, the dopants Al (0 mol %≤Al<0.1 mol % calculated as $Al_2O_3$ and based on 100 mol % of ZnO), Ba (0 mol %≤Ba<0.1 mol % calculated as BaO and based on 100 mol % of ZnO), B (0 mol %≤B<0.1 mol % calculated as $B_2O_3$ based on 100 mol % of ZnO) and Si (0 mol %≤Si<0.1 mol % calculated as $SiO_2$ and based on 100 mol % of ZnO) were added in a water-soluble form. Subsequently, the main ZnO component, for example, in powder form, was stirred into the first suspension and grinding was continued until a median grain size of d(50%)<0.7 m was attained.

In a second step, an aqueous solution of yttrium acetate containing 1.03 mol % of yttrium (calculated as $Y_2O_3$ and based on 100 mol % of ZnO) was prepared. The yttrium present in the solution was precipitated as yttrium hydroxide by means of ammonium carbonate in excess while stirring, which formed a colloidal suspension. In order to allow the reaction to run to completion, the colloidal suspension was stirred for a further 30 min after the addition of the precipitant.

Subsequently, the first suspension containing the first portion of the additives, the dopants and the main ZnO component was mixed with the colloidal suspension and converted to a homogeneous resulting suspension by means of a homogenizer working by the rotor-stator principle for 30 min.

The resulting suspension thus obtained was dried by means of a suitable method, for example, spray drying, sieved and freed of volatile constituents, such as ammonium residues and acetate residues, in an oven at 500° C., to obtain the ceramic material.

For the production of the ceramic body 1, the ceramic material was blended with water and organic binders and then dried. The dried mass was sieved with a sieve of mesh size 180 μm in order to obtain free-flowing and compressible pellets that were pressed on a laboratory press to give a cylinder having a diameter of 15.5 mm and a thickness of 1.3 mm. The pressed cylinder was freed of temporary binders in a decarburization oven at 450° C. and then sintered at 1010° C. for 3 hours.

The sintered component was surface ground to a thickness of 0.35 mm. The ground surfaces were printed centrally with a silver paste that was then baked into the ceramic body at 750° C. in order to obtain the outer contacts 2 of the varistor. The monolithic varistor thus obtained shows a high specific varistor voltage of 1528 V/mm.

Figure 2:
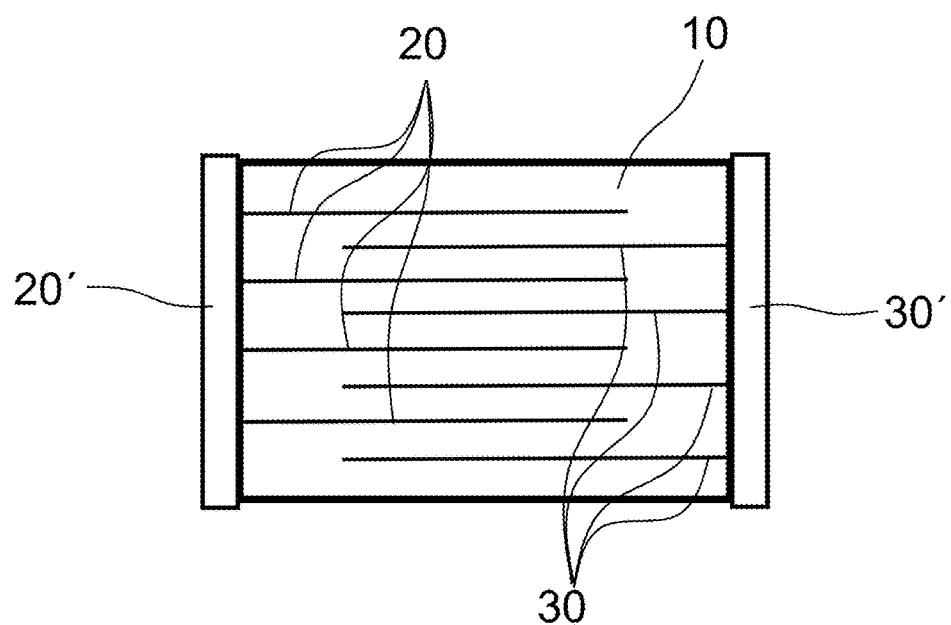
FIG. 2 shows a schematic cross section of an embodiment of a multilayer varistor containing a ceramic body.

FIG. 2 shows, in schematic cross section, an embodiment of a multilayer varistor wherein the ceramic body 10 has been produced from a ceramic material according to embodiments, wherein the ceramic material has been produced in the same way as described for FIG. 1. For the production of the ceramic body 10 of the multilayer varistor, the ceramic material was processed to a ceramic film in a first step. For this purpose, the ceramic material was suspended in a solvent and provided with auxiliaries for film drawing. By means of the doctor blade method, a ceramic film was produced on a laboratory drawing machine in such a way that a layer thickness of 47 μm was achieved after the sintering. Subsequently, for production of first and second inner electrodes 20 and 30 of the multilayer varistor, the ceramic film was printed with an Ag/Pd inner electrode metallization. In a further step, a multitude of ceramic films were stacked one on top of another in such a way as to obtain an alternating sequence of the first and second inner electrodes 20 and 30. The film stack obtained was compressed and a component of type 1210 was punched out. Subsequently, the component was debindered and sintered at 1010° C. For attachment of the first and second inner electrodes 20 and 30 to the outer electrodes 20' and 30', the ends of the sintered component were dipped into an Ag paste and baked, by means of which the component can be contacted. Then the first inner electrodes 20 are connected to the outer electrodes 20' and the second inner electrodes 30 to the outer electrodes 30'. The varistor thus obtained has a specific varistor voltage of 1468 V/mm.

Figure 3:
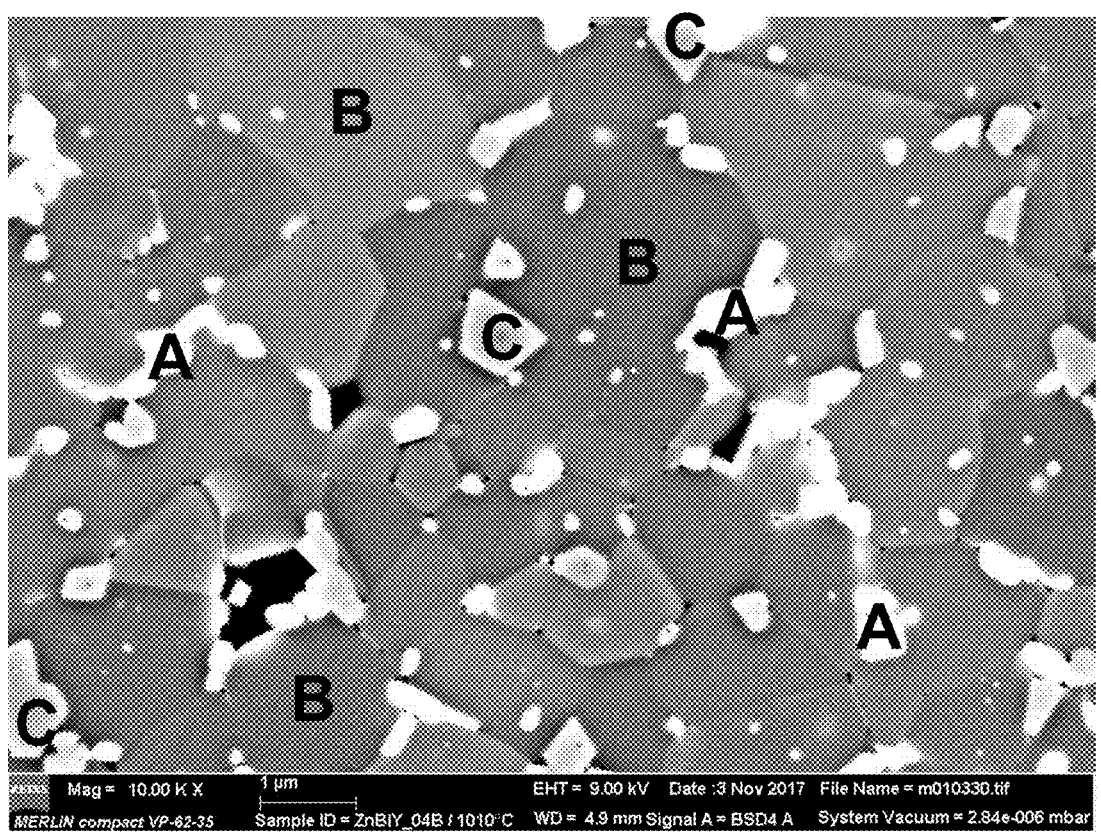
FIG. 3 shows an image of the microstructure of a ceramic produced according to embodiments.

FIG. 3 shows an image of the microstructure of an embodiment of a ceramic body that has been produced from the ceramic material according to embodiments, for example, a ceramic body produced by the process described with reference to FIG. 1.

In the microstructure, it is possible to distinguish three phases. ZnO grains B constitute the main component. In addition, an yttrium- and bismuth-rich phase A and an antimony-rich phase C occur. The addition of the yttrium component as a colloidal solution generated a very homogeneous distribution of the yttrium- and bismuth-rich phase A in the densely sintered ceramic, which uniformly and effectively limited the grain growth of the ZnO. This is clearly manifested by the average grain size of the ZnO grains B, which is within a range between 1 μm and 3 μm. The small amount of additives in conjunction with the homogeneous distribution of the yttrium- and bismuth-rich phase A and of the antimony-rich phase C in a ceramic body according to embodiments assures good contact between the individual ZnO grains B. This leads to improved volume efficiency of the ceramic body containing the ceramic material that has been produced by one of the processes described above, by means of which it is possible, for a given input voltage, to use smaller varistors or, for the same active volume, to achieve a higher input voltage. As a result, the ceramic body consisting of the novel ceramic material meets the demands with regard to further miniaturization and enhanced performance of varistors.

The invention claimed is:

1. A ceramic material comprising:
ZnO as main constituent;
Y as a first additive;
second additives comprising Cr and optionally at least one additional compound containing a metal element, wherein the metal element is selected from the group consisting of Bi, Co, Mn, Ni and Sb;
$Si^{4+}$ as a first dopant; and
second dopants comprising $Ba^{2+}$ and optionally at least one additional compound containing a metal cation from $Al^{3+}$ or $B^{3+}$,
wherein a corresponds to a molar proportion of Bi calculated as $Bi_2O_3$, b corresponds to a molar proportion of Y calculated as $Y_2O_3$, c corresponds to a molar proportion of Al calculated as $Al_2O_3$, d corresponds to a molar proportion of Ba calculated as BaO, e corresponds to a molar proportion of B calculated as $B_2O_3$, f corresponds to a molar proportion of Si calculated as $SiO_2$, g corresponds to a molar proportion of Ni calculated as NiO, h corresponds to a molar proportion of Co calculated as $Co_3O_4$, i corresponds to a molar proportion of Cr calculated as $Cr_2O_3$, j corresponds to a molar proportion of Sb calculated as $Sb_2O_3$, and k corresponds to a molar proportion of Mn calculated as $Mn_3O_4$,
wherein the molar proportions mentioned above are based on 100 mol% of ZnO,
wherein:

0.5 mol % ≤ b ≤ 3.0 mol %, 0 mol % < d < 0.1 mol %, and 0 mol % < f < 0.1 mol %, 0.0 mol % < i ≤ 0.3 mol %, wherein:

0.1 mol % ≤ a ≤ 0.99 mol % when Bi is present, 0 mol % < c < 0.1 mol % when $Al^{3+}$ is present, 0 mol % < e < 0.1 mol % when $B^{3+}$ is present, 0.7 mol % ≤ g ≤ 1.5 mol % when Ni is present, 0.3 mol % ≤ h ≤ 0.8 mol % when Co is present, 1.1 mol % ≤ j ≤ 1.9 mol % when Sb is present, and 0.2 mol % ≤ k ≤ 0.4 mol % when Mn is present.

2. The ceramic material as claimed in claim 1, wherein at least one of the additives is selected from the group consisting of metal oxides, metal carbonates, metal acetates, metal nitrates and mixtures thereof.

3. The ceramic material as claimed in claim 1, wherein at least one of the dopants is selected from the group consisting of metal nitrides, metal nitrates, metal acetates, metal hydroxides, metal oxides and mixtures thereof.

4. The ceramic material as claimed in claim 1, wherein the ceramic material is sintered at a sintering temperature of not exceeding 1010° C.

5. A method for producing the ceramic material as claimed in claim 1, the method comprising:
producing a first suspension containing a first portion of the additives and the dopants;
adding ZnO to the first suspension;
producing a colloidal suspension containing at least one further compound selected from the additives;
mixing the first suspension and the colloidal suspension thereby forming a resulting suspension;
drying the resulting suspension to form the ceramic material; and
burning off volatile constituents from the ceramic material.

6. The method as claimed in claim 5, wherein producing the colloidal suspension comprises converting an initial charge of the at least one further compound selected from the additives in form of a solution to the colloidal suspension by precipitation by a precipitant.

7. The method as claimed in claim 5, further comprising:
producing pellets from the burnt ceramic material;
pressing the pellets;
burning off organic binders;
sintering the pressed pellets to provide a ceramic body; and
surface grinding the sintered ceramic body.

8. The method as claimed in claim 7, wherein producing the pellets comprises:
forming a ceramic mass by blending the burnt ceramic material;
drying the ceramic mass; and
sieving the dried ceramic mass.

9. The method as claimed in claim 5, further comprising:
processing the burnt ceramic material to provide a ceramic film;
printing the ceramic film with first and second inner electrodes;
stacking a plurality of ceramic films;
pressing the stacked ceramic films;
stamping a ceramic component out of the pressed and stacked ceramic films;
debindering the ceramic component;
sintering the ceramic component at not more than 1010° C.; and
applying outer electrodes to the ceramic component.

10. The method as claimed in claim 9, wherein processing the burnt ceramic material to provide the ceramic film comprises:
suspending the ceramic material;
introducing auxiliaries for film drawing; and
drawing the ceramic film.

11. The method as claimed in claim 9, wherein the first and second inner electrodes comprises Ag, Pd or an alloy of Ag and Pd.

12. A varistor comprising:
a ceramic body containing a sintered ceramic material according to claim 1.

13. The varistor as claimed in claim 12, wherein the varistor has a specific varistor voltage of ≥1000 V/mm.

14. A method for producing the varistor as claimed in claim 12, the method comprising:
forming and sintering the ceramic body from the ceramic material, wherein the ceramic material is sintered at not more than 1010° C.;
applying outer contacts to the sintered ceramic body; and
baking the outer contacts into the ceramic body.

15. A ceramic material comprising:
ZnO as main constituent;
Y as a first additive;
second additives comprising Cr and optionally at least one additional compound containing a metal element, wherein the metal element is selected from the group consisting of Bi, Co, Mn, Ni and Sb;
$Si^{4+}$ as a first dopant; and
second dopants comprising $Ba^{2+}$ and optionally at least one additional compound containing a metal cation from $Al^{3+}$ or $B^{3+}$.

16. The ceramic material as claimed in claim 15, wherein at least one of the additives is selected from the group consisting of metal oxides, metal carbonates, metal acetates, metal nitrates and mixtures thereof.

17. The ceramic material as claimed in claim 15, wherein at least one of the dopants is selected from the group consisting of metal nitrides, metal nitrates, metal acetates, metal hydroxides, metal oxides and mixtures thereof.

18. The ceramic material as claimed in claim 15, wherein the ceramic material is sintered at a sintering temperature of not exceeding 1010° C.

19. A varistor comprising:
a ceramic body containing a sintered ceramic material according to claim 15.

20. The varistor as claimed in claim 19, wherein the varistor has a specific varistor voltage of ≥1000 V/mm.

* * * * *